US007657932B2

(12) United States Patent
Ballinger et al.

(10) Patent No.: US 7,657,932 B2
(45) Date of Patent: *Feb. 2, 2010

(54) EXTENDIBLE SECURITY TOKEN MANAGEMENT ARCHITECTURE AND SECURE MESSAGE HANDLING METHODS

(75) Inventors: Keith W. Ballinger, North Bend, WA (US); HongMei Ge, Issaquah, WA (US); Hervey O. Wilson, Bellevue, WA (US); Vick B. Mukherjee, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 841 days.

This patent is subject to a terminal disclaimer.

(21) Appl. No.: 10/891,926

(22) Filed: Jul. 14, 2004

(65) Prior Publication Data

US 2006/0015932 A1    Jan. 19, 2006

(51) Int. Cl.
*H04L 9/32* (2006.01)
*G06F 21/00* (2006.01)

(52) U.S. Cl. .............................. 726/9; 726/10; 713/172; 713/185

(58) Field of Classification Search ............... 726/9, 726/1, 10; 713/172, 170, 180, 181, 185, 713/152, 182
See application file for complete search history.

(56) References Cited

U.S. PATENT DOCUMENTS

| 6,178,504 | B1 * | 1/2001 | Fieres et al. ................ 713/164 |
| 6,385,729 | B1 * | 5/2002 | DiGiorgio et al. ............. 726/9 |
| 2002/0053028 | A1 * | 5/2002 | Davis ........................ 713/200 |
| 2004/0117430 | A1 * | 6/2004 | Bazot et al. ................. 709/200 |
| 2004/0139352 | A1 * | 7/2004 | Shewchuk et al. ........... 713/201 |
| 2004/0162786 | A1 * | 8/2004 | Cross et al. .................... 705/59 |
| 2004/0268124 | A1 * | 12/2004 | Narayanan .................. 713/164 |
| 2005/0044398 | A1 * | 2/2005 | Ballinger et al. ............ 713/200 |
| 2005/0182941 | A1 * | 8/2005 | Della-Libera et al. ....... 713/181 |
| 2005/0257073 | A1 * | 11/2005 | Bade et al. .................. 713/193 |
| 2008/0022381 | A1 * | 1/2008 | Le Saint ........................ 726/9 |

OTHER PUBLICATIONS

Oasis "Web services security core specification" Dec. 2002 PC Magazin Editors Choice, Phillips Hallam-Becker et al. pp. 1-56.*
IBM "WS-Security Profile for XML-based tokens" Aug. 2002, Phillips Hallam-Baker et al.*
Web services security specification (WS-security, WS-Security 2004), pp. 1-32.*
Web security profile for XML based tokens Aug. 2002.*
"RSA security designs new web services software to efficiently leverage identity management infrastructures" PR Newswire. New York, Apr. 2003, pp. 1-3.*

* cited by examiner

*Primary Examiner*—Eleni A Shiferaw
(74) *Attorney, Agent, or Firm*—Workman Nydegger (57) ABSTRACT

A message handling computing system that provides security across even transport-independent communication mechanisms, and which allows for convenient extension of security to different security token types, and may provide end-to-end security across different transport protocols. The message handling computing system includes a message handling component configured to send and receive network messages having security tokens. The message handling component interfaces with an expandable and contractible set of security token managers through a standardized application program interface. Each security manager is capable of providing security services for messages that correspond to security tokens of a particular type. A security token plug-in component registers new security token managers with the message handling component.

28 Claims, 3 Drawing Sheets

EXTENDIBLE SECURITY TOKEN MANAGEMENT ARCHITECTURE AND SECURE MESSAGE HANDLING METHODS

BACKGROUND OF THE INVENTION

1. The Field of the Invention

The present invention relates to network technology; and more specifically, to an architecture for managing security tokens that is extensible to different token types, and to associated secure message handling methods.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Networking technologies enable computing systems to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Unfortunately, computer networks also can potentially open up connected computing systems to security breaches. One type of security breach is for one computing system or user to make false claims about who they are to thereby access network resources they should not have access to. Another security breach is referred to as "eavesdropping" by which an eavesdropper computing system accesses the content of a network communication even though the eavesdropper is an unintended and unwanted party in the communication. In addition, an eavesdropper or other entity might alter the network communication on its way to its intended destination. Any of these security breaches can be quite harmful.

In order to guard against these security breaches, a variety of security technologies have been developed. These technologies are based upon the use of security tokens. Security tokens may be used to authenticate a provider of the security token. In this manner, the security token is comparable in the electronic domain to a passport or driver's license in the physical domain. Proper authentication provides some level of security that each party to the network communication is indeed who they purport to be. Security tokens may also be used to encrypt all or portions of a network message, thereby preventing eavesdropping by those who do not have access to the security token. Furthermore, security tokens may be used to sign portions of an electronic message to thereby allow those validating this signed portion to determine if the electronic message has been changed since the time it was signed. Authentication, encryption, and electronic signing thus provide some protection against security breaches in network communications.

Network communications increasingly extend beyond transport-level barriers. For example, a Simple Object Access Protocol (SOAP) envelope may be transmitted from one computing system to even while traveling through several transport domains. This is referred to as SOAP tunneling. A HyperText Transport Protocol (HTTP) computing system may transmit a SOAP envelope within an HTTP message to another HTTP computing system. Along the way, however, the SOAP envelope may be placed in other messages that follow different transport protocols, such as, for example, Message Queues (MQ), Simple Mail Transport Protocol (SMTP), CORBA/IIOP, or the like.

While transport-independent network messaging allows for great flexibility in communication, conventional security mechanisms are transport-dependent. End-to-end message level security across multiple transports requires additional technology. Conventional end-to-end security across multiple transport domains has been provided in the form of the Web Services (WS)-Security specification.

The WS-Security Specification only expressly addresses the use of specific security tokens such as, for example, user name token with user name and password, X.509 certificates, Kerberos tokens and others. However, the number of types of security tokens available for use in authentication, encryption, and electronic signing is rapidly expanding. Accordingly, what would be advantageous is a mechanism for managing security tokens that is extensible to a variety of different security token types, and which is compatible with transport-independent networking technologies such as SOAP.

BRIEF SUMMARY OF THE INVENTION

The foregoing problems with the prior state of the art are overcome by the principles of the present invention, which are directed towards a message handling computing system that provides security across even transport-independent communication mechanisms, and which allows for convenient extension of security to different security token types.

The message handling computing system includes a message handling component configured to send and receive network messages having security tokens. The message handling component interfaces with an expandable and contractible set of security token managers through a standardized application program interface. Each security token manager is capable of providing security services for messages that correspond to security tokens of a particular type. Such security services might include, for example, the providing of processable representations of the security token in response to receiving another version of the security token or perhaps just an identifier corresponding to the security token. The message handling computing system also includes a security token plug-in component that registers new security token managers with the message handling component. In one embodiment, a developer tool may also be provided to allow for the convenient authoring of new security token managers corresponding to different security tokens.

When receiving a network message, the message handling component identifies a security token manager capable of providing a processable security token associated with the received network message, calls the identified security token manager through the standardized interface, receives the processable security token from the security token manager through the interface, and then performs any further processing as appropriate. In one embodiment, the network messages may be SOAP messages. In that case, the security token managers may be capable of receiving XML representations of the security token (or an identifier) and providing an appropriate executable representation of the security token.

When transmitting a network message, the message handling component accesses a policy object to thereby identify a sending security token needed to successfully send or otherwise provide security to the network message. The message handling component then calls the security token manager corresponding to the sending security token using the standardized interface. The message handling component then receives the appropriate security token from the corresponding security token manager using the standardized interface, and then processes the network message as appropriate given the policy. In an XML environment, the message handling computing system may receive an XML description of policy for a security token type, send that XML description to the appropriate security token manager, and then receive an executable representation of a corresponding policy object.

Accordingly, the principles of the present invention allow for an extensible network security mechanism in which a pluggable infrastructure is provided allowing for new security token managers to be conveniently added for different security tokens as needed. Furthermore, the architecture is compatible with transport-independent communication mechanisms thereby providing end-to-end message level security across multiple transport domains.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The principles of the present invention relate to a message handling computing system that provides security across even transport-independent communication mechanisms, and which allows for convenient extension of security to different security token types, and may provide end-to-end security across different transport protocols. The message handling computing system includes a message handling component configured to send and receive network messages having security tokens. The message handling component interfaces with an expandable and contractible set of security token managers through a standardized application program interface. Each security token manager is capable of providing security services for messages that correspond to security tokens of a particular type. A security token plug-in component registers new security token managers with the message handling component.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

Figure 1:
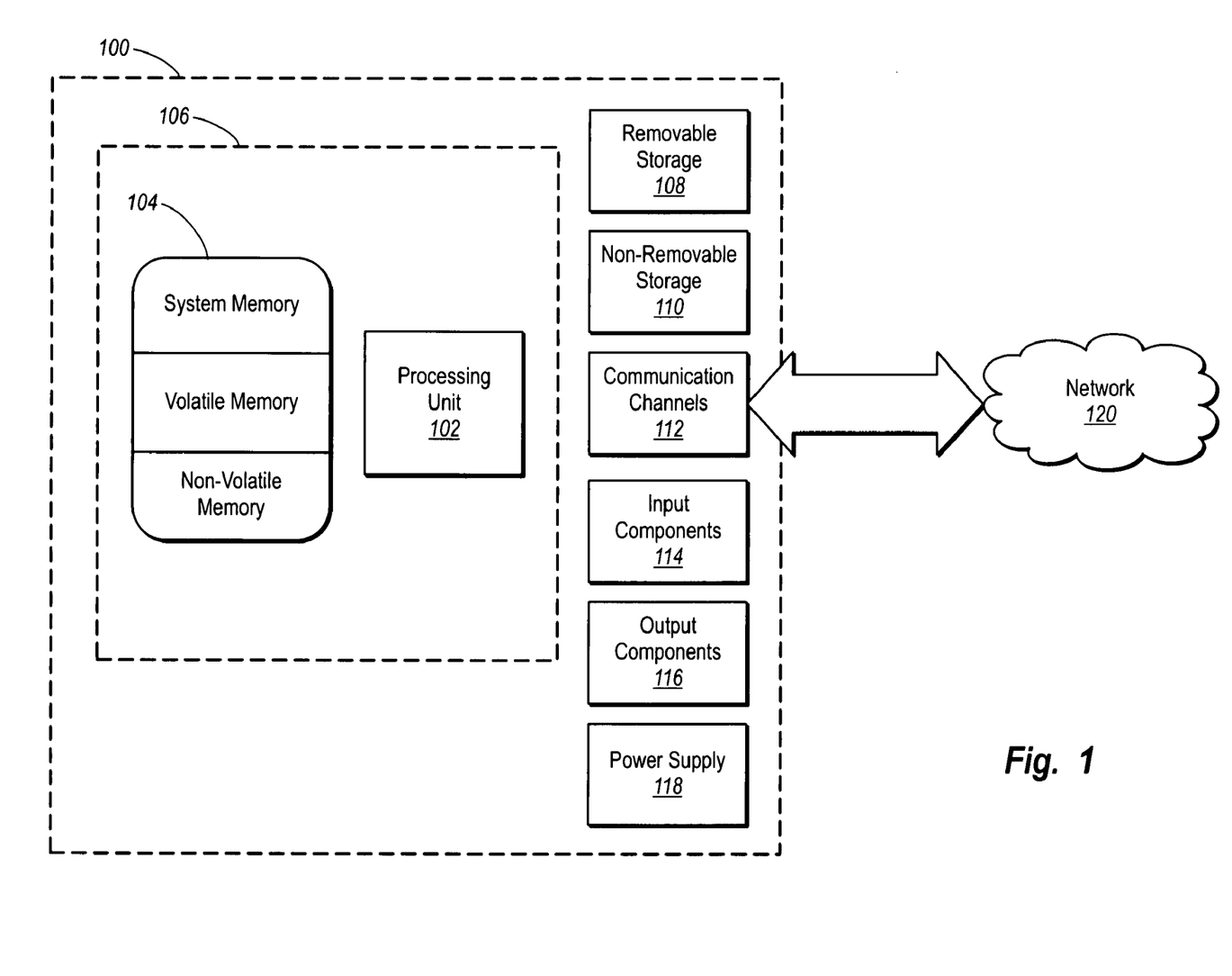
FIG. 1 illustrates a suitable computing system that may implement features of the present invention.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

Figure 2:
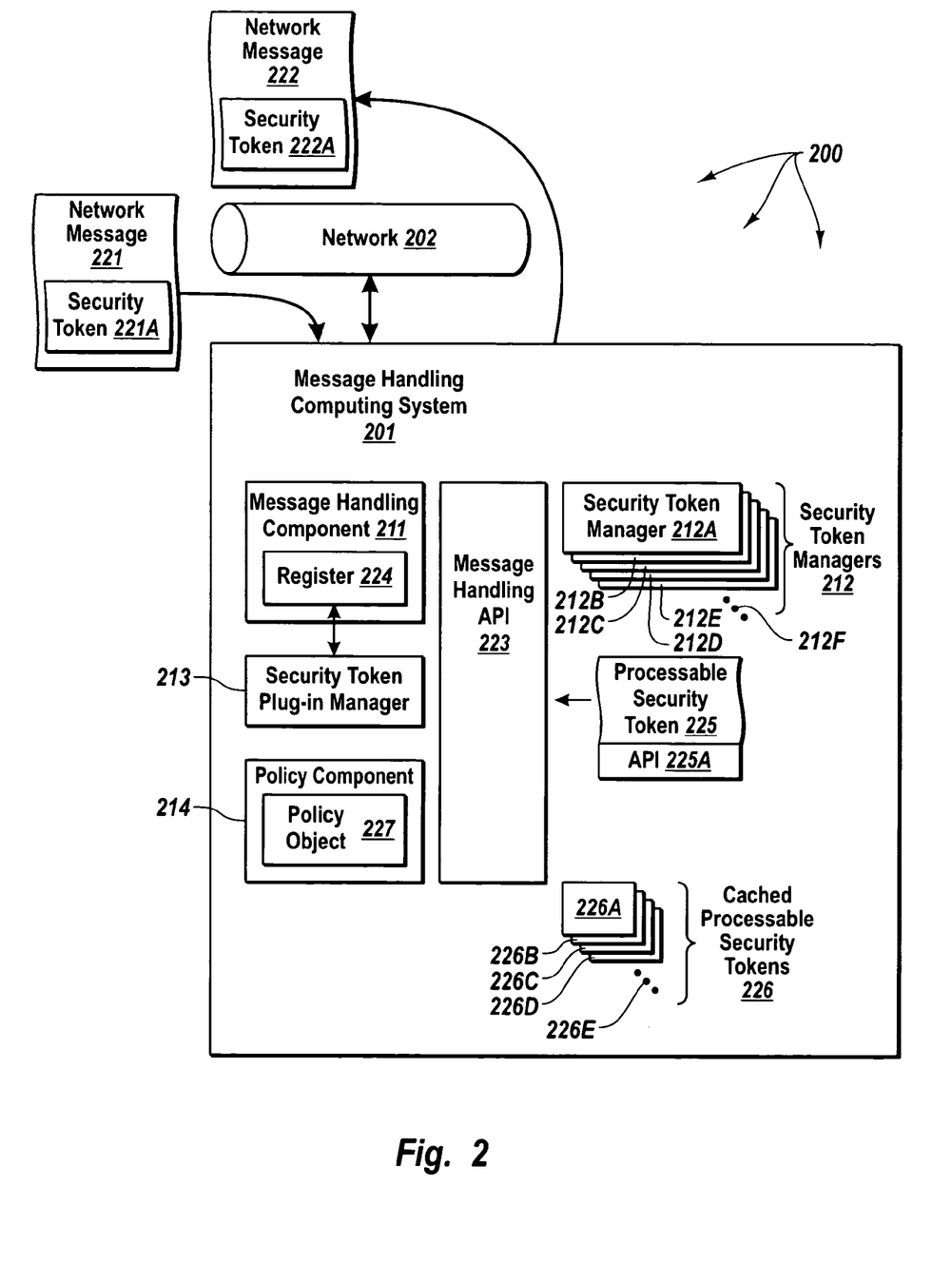
FIG. 2 schematically illustrates a network environment that includes a message handling computing system in accordance with the principles of the present invention.

FIG. 2 illustrates a network environment 200 that includes a message handling computing system 201 coupled to a network 202. The computing system 201 may be as described above for the computing system 100, although this is not required. The computing system 201 may be any computing system that is capable of executing the principles of the present invention. In this description and in the claims, a "computing system" is defined as any device or system that has a system memory, and at least one processor capable of executing instructions from system memory. The system memory may comprise any volatile memory including Random Access Memory (RAM), flip-flops, registers, or the like. A computing system may even be a cluster of other computing systems cooperatively interacting to provide a service.

The message handling computing system 201 may have in its memory computer-executable instructions that when executed by the computing system 201 cause the computing system to instantiate several functional components in its system memory. If the computing system 201 is a cluster of computing systems, the instantiated functional components described hereinafter may be distributed.

For instance, as illustrated in FIG. 2, the message handling computing system 201 may instantiate a message handling component 211, a number of security token managers 212, a security token plug-in component 213, and a policy component 214. Each of these components may be one or more executable components. In addition, the illustrated components may be functionally distributed across multiple components. If the message handling computing system 201 were the computing system 100 of FIG. 1, the associated system memory may be, for example, memory 104, and the network 202 may be, for example, network 120.

The message handling component 211 is configured to send and receive network messages associated with a security token and to apply security to the received and sent messages. For example, the message handling component 211 may receive network message 221 having associated security token 221A, or may send network message 222 having associated security token 222A. A security token is "associated with" a message in that it is either included in the message, or referenced in the message.

The security token managers 212 include any number of security token managers. In the illustrated case, the security token managers include five security token managers as represented by security token managers 212A through 212E amongst potentially many others as represented by the ellipses 212F. Each of the security token managers is configured to provide security services for network messages that correspond to a security token of a particular type. Such "security services" may include authenticating the identity of a message sender based on a security token provided to it, and/or providing of a processable representation of a security token in response to receive another (e.g., XML) representation of the security token or a security token identifier. The message handling component may then rely on that authentication and/or use the processable representation of the security token for further processing such as encryption/decryption and/or electronic signing. Security services may alternatively or in addition involve the actual encryption or decryption of the message, the electronic signing of at least a portion of the message, the verifying of electronic signatures and/or the authorization itself.

As just mentioned, each of the security token managers provides security services for security tokens of one particular type. For example, security token manager 212A may provide security services for messages having user name security tokens. Security token manager 212B may provide security services for Kerberos security tokens. Security token manager 212C may provide security services for X.509 certificate security tokens. Security token manager 212D may provide security services for SAML security tokens. Security token manager 212E may provide security services for XrML security tokens. In addition, there is a rapidly expanding number of security tokens becoming available for authentication, encryption, and signing. There are literally dozens of such security tokens now available. Each of the security token managers 212 interfaces with the message handling component 211 using a standardized message handling application program interface 223.

In accordance with the principles of the present invention, the number and variety of security token managers is expandable and contractible. In order to facilitate this, a security token plug-in component 213 registers new security token managers for new security token types with the message handling computing system 201. An example of this is register 224. The new security token manager may include executable code for automatically notifying the security token plug-in component 213 of its identifier, along with the security token types that the new security token manager provides security services for.

In addition, when security token managers are to be removed (e.g., due to reduced or eliminated use of the corresponding security token type), the security plug-in manager 213 may deregister the security token manager from the message handler computing system 201 in one embodiment of the present invention.

In order to implement appropriate policy on messages having particular security tokens, a policy component 214 may also be provided. In general, policy involves rules regarding how a message having a particular security token is to be handled. For example, the policy may involve what authentication techniques are appropriate for a given security token, when encryption decryption algorithm is to be imposed for the security token, or what portions of the message are to be signed for a given security token. In addition, the policy may also govern how messages are to be treated in response to characteristics other than the security token. For example, policy may govern how messages are to be treated given a particular message sender, given a priority indication in the message, given the length of the message, given the message type, or given any other relevant factor. One conventional mechanism for expressing such policy using eXtensible Markup Language (XML) is specified in the conventionally known WS-Security Policy specification. However, this specification expresses particular policy schemas only for particular security token types.

The remaining items illustrated in FIG. 2 will be described with respect to FIGS. 3 and 4, which illustrated methods for receiving and sending network messages using the expandable security token message handling architecture of FIG. 2. As the methods 300 and 400 of FIGS. 3 and 4 may be performed in the environment of FIG. 2, the methods 300 and 400 will be described with frequent reference to the network environment 200 of FIG. 2.

The processes associated with receiving and sending network messages having associated security tokens will be described generally, and also with respect to a specific embodiment in which the network message are or include Simple Object Access Protocol (SOAP) envelopes. SOAP is a protocol that permits transport-independent delivery of network messages since the SOAP envelope may be encapsulated using a variety of different transport protocols such as, for example, MQ, Simple Mail Transport Protocol (SMTP), CORBA/IIOP, or the like. The compatibility of the principles of the present invention with SOAP permits for the convenient use of expandable security tokens for use in transport-independent network communication.

Figure 3:
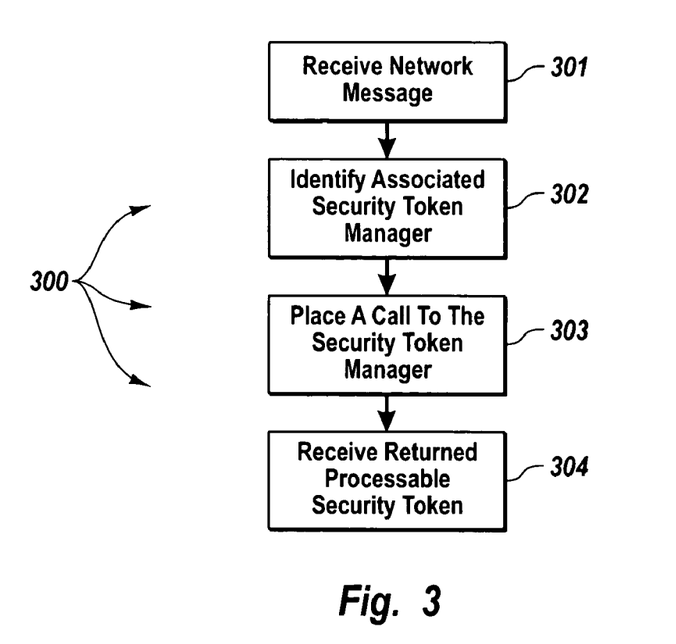
FIG. 3 illustrates a flowchart of a method for securely receiving a network message in accordance with the principles of the present invention.

FIG. 3 illustrates a flowchart of a method 300 for securely receiving network message in accordance with the principles of the present invention. First, the network handling computer system 201 receives a network message from the network (act 301). An example of such a received network message include received network message 221 having a specific associated security token 221A. However, the method 300 may just as well be applied to the receipt of any network message so long as there is a security token manager 212 that provides security services for the corresponding security token in the network message. The security token 221A would typically be included in the message if used for authentication or electronic signing in cases where the message recipient did not previously receive the security token. The security token 221A would typically not be included in the message if used for encryption, or if the recipient had not previously received the security token.

The message handling component 211 then identifies a security token manager capable of providing a processable security token associated with the received network message (act 302). To do so, the message handling component 211 deserializes and parses the network message into its constituent components. For example, if the received network message 221 is a SOAP envelope, the constituent components may be an XML document that follows a predefined schema understood by the parser. After this parsing, the message handling component 211 may then access an identification of the security token type as well as the security token itself. Alternatively or in addition to accessing the security token itself, the message handling component 211 may access an identifier for the security token corresponding to the message. The message handling component 211 may then use the register 224 to identify the corresponding security token manager for that security token type.

Alternatively, the message handling component may enumerate through the plurality of security token managers with information from the received network message until one of the security token managers indicates an ability to provide the processable security token associated with the received network message. This polling may be accomplished by placing calls through the message handling application program interface 223.

In one embodiment, the register 224 indicates a one-to-one correlation between security token type and the security token manager. However, a single security token manager may be capable of providing security services for more than one security token type.

The message handling component 211 then may place a call through the message handling application programming interface 223 (act 303) to provide the security token identifier and/or the security token itself to the appropriate security token manager 212. For the rest of the discussion of receiving method of FIG. 3, assume that the appropriate security token manager is security token manager 212A.

In response, the security token manager 212A uses the security token identifier to access a stored processable security token if a security token identifier is provided. The processable security token may be, for example, an executable object having a standardized interface through which another component may place calls to the processable security token to access security services associated with the corresponding security token. An example of a situation in which the security token identifier is provided, rather than the security token, is when the security token was used to decrypt on the receiving end. In that case, the security token may be a secret key not to be transmitted in the open. Accordingly, a security token identifier, rather than the security token itself, is in the network message.

Alternatively or in addition, the security token itself may be provided to the security token manager 222A. In that case, the security token manager 222A may generate the processable version of the security token based on the version of the security token that the message handling component 211 provided. An example of a situation in which the messaging handling component 211 would provide the security token to the security token manager may be, for example, when the security token is used to authenticate the message sender, or validate a signed portion of the network message. If the network message 221 were, for example, a SOAP envelope, the security token 221A may be a serialized version of the XML element that corresponds to the security token. The security token manager may receive the serialized security token as an input, and use that to generate the processable security token. Any method for converting a serialized security token into a processable security token will suffice.

Regardless of whether the security token manager 222A accesses or generates the processable security token, the processable security token is then returned to the message handling component 211 using the message handling application program interface (act 304). An example of this processable security token is illustrated as processable security token 225 having a security token application program interface 225A.

The message handling component 211 may then use the processable security token 225 to perform any one of many possible security services for the security token. The security token application program interface 225A may be used to access executable code in the processable security token 225 to authenticate the sender of the message, decrypt any encrypted portions of the network message, or validate any electronically signed portions of the network message. Alternatively, the corresponding security token manager may provide any or all of these security services.

The message handling component 211 may cache processable security tokens that had been previously acquired from an appropriate security token manager. These cached processable security tokens are illustrated as cached processable security tokens 226A through 226D amongst potentially others as represented by the ellipses 226E. The processable security tokens might be cached for an appropriate duration such as for example, the duration of a session.

The message handling component 211 then may pass the received message (or a processed version of the received message) to a policy component 214. The policy component evaluates how to handle the received message using a policy object corresponding to the security token type of the security token corresponding to the received network message. The policy object may be an executable component that is also constructed by the appropriate security token manager. In one embodiment, an XML document expressing policy to be applied to the messages corresponding to a particular security token type is provided to the policy component 214. For example, an XML schema for expressing policy for a number of different security types is defined by WS-Security Policy. WS-Security Policy defines such schemas for user name and password, Kerberos, X.509 certificates, and the like.

The policy component 214 then provides the XML policy document to the appropriate security token manager through the message handling application program interface 223. The security token manager converts the XML policy document into an executable policy object, which exposes methods whereby the policy expressed in the XML policy document is applied. The policy component 214 then receives this processable policy component through the message handling application program interface 223. The policy objects correspond to security token types rather than the particular security token itself. An example of the policy object is illustrated in FIG. 2 as policy object 227.

Figure 4:
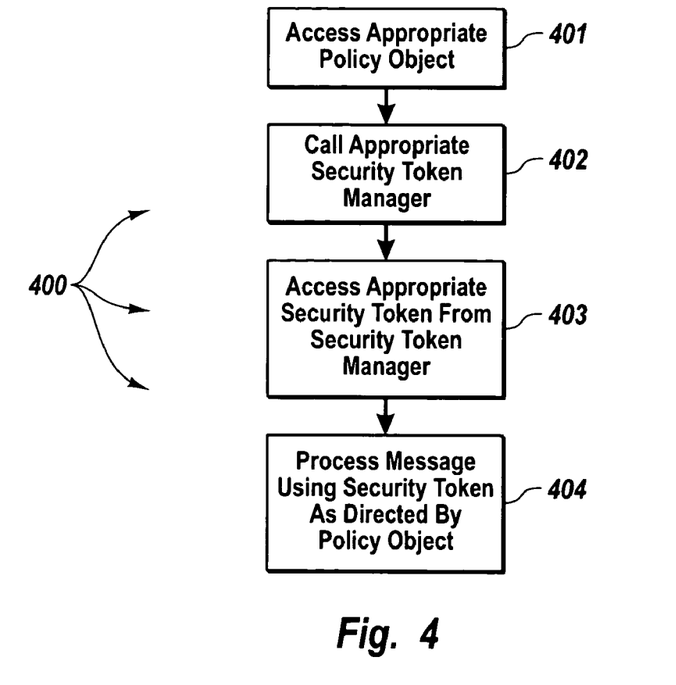
FIG. 4 illustrates a flowchart of a method for securely sending a network message in accordance with the principles of the present invention.

FIG. 4 illustrates a flowchart of a method 400 for securely sending a network message. For example, the message handling computing system 201 may be sending the network message 222.

In order to send the network message, the appropriate policy object for the security token to be used for sending the network message is accessed (act 401). For example, in the case of sending the message 222, the policy object corresponding to the security token 222A may be accessed. By executing the policy object, the appropriate security token needed to securely send the network message is identified.

The message handling component 211 then calls the security token manager corresponding to the security token needed to send the message using the standardized message handling application program interface (act 402), and receives the appropriate security token from the corresponding security token manager using the standardized message handling application program interface (act 403).

The message handling component 211 performs the appropriate security services on the network message using the appropriate security token (act 404). For example, the security token (or its identifier) may be included in the network message for purposes of authentication. The security token may be used to encrypt all or portions of the network message. The security token may also be used to electronically sign portions of the network message. The type of processing is dictated by the corresponding policy object.

Accordingly, embodiment of the present invention have been described in which a message handling computing system provides security across even transport-independent communication mechanisms, and which allows for convenient extension of security to different security token types. This allows for improved and more flexible security in a transport-independent network environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. One or more computer storage media for use in a message handling computing system including one or more networked machines, each networked machine having one or more processors and system memory, one specified network machine including one or more computer storage media having stored thereon computer-executable instructions that, when executed at a processor, cause the specified networked machine to instantiate the following in a a system memory:

a message handling component configured to send and receive network messages having any of a plurality of differently formatted types of security tokens;

a plurality of security token managers resident at the specified network machine, the plurality of security token managers collectively facilitating use of a common message handling application program interface by translating between any of the plurality of differently formatted types of security tokens and a common processable security token type used by the common message handling application program interface and vice versa wherein the message handling component is further configured to:

read an identification of a security token type from a security token in a received network message, the security token type corresponding to a specified technology selected from among: kerberos, X.509, security assertion markup language, and extensible rights markup language;

identify a security token manager corresponding to the identified security token type of the specified technology selected from among: kerberos, X.509, security assertion markup language, and extensible rights markup language respectively; and send the security token to the identified security token manager for conversion;

wherein each of the plurality security token managers is further configured to:

receive security tokens from the message handling component;

convert the received security tokens into a processable security token of the common processable security token type, the processable security token being an executable object having a standardized security interface through which other components at the message handling computing system can place calls to the standardized security interface to access security services represented in a received security token, converting the received security tokens including; insert information contained in policy objects into the received security tokens of any of one or more plurality of differently formatted types of security tokens; and send the received security tokens of one of the one or more plurality of differently formatted types of security tokens that include information inserted from the policy objects to other networked machines configured to process the security tokens of the one or more plurality of differently formatted types of security tokens; and a security token plug-in component configured to:

register new security token managers at the specified networked machine, registration of each new security token manager enabling the specified networked machine to translate between security tokens of new security token types and the common processable security token type and vice versa, such that said each new security token manager is registered to communicate with the message handling component via the common message handling application program interface such that a unique interface is not required for the message handling component to communicate with any newly registered security token manager; and deregister registered security token managers that are to be removed from the message handling computing system.

2. The one or more computer storage media in accordance with claim 1, wherein the network messages that are sent and received by the message handling component include a simple object access protocol (SOAP) envelope.

3. The one or more computer storage media in accordance with claim 1, wherein the message handling component is configured to perform the following when receiving the network message;

receiving a received network message including the security token, the security token being of particular type of security token;

identifying a corresponding security token manager, from among the plurality of security token managers configured to convert the security tokens of the particular type to processable security tokens;

calling the identified security token manager through the standardized message handling application program interface to provide the received security token to the corresponding security token manager;

receiving the processable security token corresponding to the received security token from the corresponding security token manager, the processable security token being the executable object having the standardized security interface through which other components can place calls to the processable security token to access security services represented in the receive security token; and calling the executable object through the standardized security interface to handle receipt of the received network message in accordance with security services represented in the received security token.

4. The one or more computer storage media in accordance with claim 3, wherein said calling the executable object through the standardized security interface to handle receipt of the received network message comprising using the processable security token provided by the identified security token manager to decrypt at least a portion of the received network message.

5. The one or more computer storage media in accordance with claim 3, wherein said calling the executable object through the standardized security interface to handle receipt of the received network message comprises using the processable security token to authenticate a sender of the received network message.

6. The one or more computer storage media in accordance with claim 3, wherein said calling the executable object through the standardized security interface to handle receipt of the received network message comprises using the processable security token provided by the identified security token manager to validate a signed portion of the received network message.

7. The one or more computer storage media in accordance with claim 3, wherein the identifying the corresponding security token manager from among the plurality of security token managers configured to convert the security tokens of the particular type to the processable security tokens associated with the received network message comprise the following:

enumerating through the plurality of security token managers with information from the received network message until one of the security token managers indicates an ability to provide a processable security token corresponding to the security token type of the received security token.

8. One or more computer-readable media in accordance with claim 3, wherein the processable security token includes a security token and a security token application program interface that may be used to perform one or more methods using the security token.

9. The one or more computer storage media in accordance with claim 3, wherein the message handling component is configured to perform the following when sending the network message:

accessing the policy object to thereby identify a security token type of a sending security token for sending the network message in accordance with the security policy;

calling the corresponding security token manager corresponding to the identified security token type, the corresponding security token manager configured to represent policy assertions of the policy objects in the sending security token of the identified security token type, the corresponding security token manager called using the standardized message handling application programming interface used by the plurality of security token managers not withstanding that each of the plurality of security token managers creates different token types;

receiving the sending security token of the identified security token type from the corresponding security token manager using the standardized messaging handling application programming interface in response to the call to the corresponding security token manager, the received sending security token representing the policy assertions on the policy object within a token of the identified security token type, the received sending security token configured for transmission along with the network message;

processing the network message in accordance with any policy assertions applicable to the sender of the network message to prepare the network message for transmission; and sending the network message along with the sending security token such that a receiver of the network message can securely receive and process the network message in accordance with a represented policy assertions contained the sending security token.

10. The one or more computer storage media in accordance with claim 9, wherein said processing the network message comprises including the sending security token in the network message to be sent.

11. The one or more computer storage media in accordance with claim 9, wherein said processing the network message includes encrypting of at least a portion of the network message using the sending security token.

12. The one or more computer storage media in accordance with claim 9, wherein said processing the network message includes signing of at least the portion of the network message using the sending security token.

13. The one or more computer storage media in accordance with claim 1, wherein the message handling component is further configured to perform the following:
providing policy information for the security token type to the corresponding security token manager through the standardized message handling application program interface; and
receiving the policy object from the corresponding security token manager through the standardized message handling application program interface.

14. The one or more computer storage media in accordance with claim 13, wherein the calling the identified security token manager through the standardized message handling application program interface comprises the following:
providing a version of the security token to the corresponding security token manager that the security token manager may use to generate the processable security token.

15. The one or more computer storage media in accordance with claim 13, wherein the calling the identified security token manager through the standardized message handling application program interface comprises the following:
providing an identifier corresponding to the processable security token to the corresponding security token manager.

16. The one or more computer storage media in accordance with claim 1, wherein the one or more computer storage media are physical media.

17. One or more computer-readable media in accordance with claim 1, wherein the physical media comprises persistent memory.

18. A computer program product stored on computer storage media for use in a message handling computing system that includes a message handling component, the message handling component configured to send and receive network messages having security tokens, a plurality of different security token managers, each of the security token managers configured to convert one or more types of different security tokens to processable security tokens of a standard format compatible with other components at the message handling computing system such that different types of security tokens can be uniformly processed at the message handling computing system to access security services represented therein, the computer program product for implementing a method for the message handling component to coordinate the secure receipt of a network message, the computer storage media including computer-executable instructions that, when executed at a processor, cause the message handling component to perform the following:
receiving the network message along with a security token, the security token being of particular type of security token, the security token indicating security services corresponding to the received network message;
reading an identification of a security token type from the security token, the security token type corresponding to a specified technology selected from among: kerberos, X.509, security assertion markup language, and extensible rights markup language;
identifying a corresponding security token manager at the message handling computing system, from among the plurality of different security token managers, the corresponding security token manager configured to convert security tokens of the identified security token type of the specified technology selected from among: kerberos, X.509, security assertion markup language, and extensible rights markup language respectively;
calling the identified security token manager through a standardized message handling application program interface to provide the received security token to the corresponding security token manager for conversion to a processable security token, the standardized message handling application program interface being configured such that any of the plurality of different security token managers are called by the message handling component through the same interface;
receiving the processable security token corresponding to the received security token back from the corresponding security token manager, the processable security token being an executable object having a standardized security interface through which other components at the message handling computing system can place calls to the processable security token to access the security services for the received network message represented in the received security token;
calling the executable object through the standardized security interface to handle receipt of the received network message in accordance with the security services represented in the received security token; and
registering a new security token manager for processing a new type of security token, such that the new security token manager is called by the message handling component through the same standardized message handling application program interface as the other security token managers.

19. The computer program product in accordance with claim 18, wherein the network messages that are sent and received by the message handling component include a simple object access protocol (SOAP) envelope.

20. The computer program product in accordance with claim 18 wherein the calling the executable object through the standardized security interface to handle receipt of the received network message comprises using the processable security token to decrypt at least a portion of the received network message.

21. The computer program product in accordance with claim 18, wherein the calling the executable object through the standardized security interface to handle receipt of the received network message comprises using the processable security token to authenticate a sender of the received network message.

22. The computer program product in accordance with claim 18, wherein the calling the executable object through the standardized security interface to handle receipt of the received network message comprises using the processable security token to validate a signed portion of the received network message.

23. The computer program product in accordance with claim 18, wherein the identifying the corresponding security token manager, from among the plurality of different security token managers, configured to convert the security tokens of the particular type to processable security tokens comprises the following:
reading the identification of the security token type from the received network message; and
identifying the security token manager corresponding to the identified security token type.

24. The computer program product in accordance with claim 18, wherein the identifying the corresponding security token manager, from among the plurality of different security token managers, configured to convert the security tokens of the particular type to the processable security tokens comprises the following:

polling each of the plurality of different security token managers with information from the received network message until one of the security token managers indicates an ability to convert the received security token to a processable security token associated with the received network message.

25. A computer program product stored on computer storage media for use in a message handling computing system that includes a message handling component configured to send and receive network messages having security tokens, a plurality of different security token managers, each of the plurality of different security token managers configured to convert one or more different types of security tokens to processable security tokens of a standard format compatible with other components at the message handling computing system such that one or more different types of security tokens can be uniformly processed at the message handling computing system to access security services represented therein, the computer program product for implementing a method for the message handling component to coordinate secure sending of a network message, the computer storage media including computer-executable instructions that, when executed at a processor, cause the message handling component to perform the following:

accessing a policy object to thereby identify policy assertions for securing the network message and to thereby identify a token type of a sending security token to represent the policy assertions when sending the network message in accordance with the policy assertions, the identified token type selected from among: kerberos, X.509, security assertion markup language, and extensible rights markup language;

identifying a corresponding security token manager at the message handling computing system, from among the plurality of different security token managers, the corresponding security token manager configured to convert policy assertions to security tokens of the identified token type selected from among: kerberos, X.509, security assertion markup language, and extensible rights markup language respectively;

calling the security token manager corresponding to the identified token type selected from among: kerberos, X.509, security assertion markup language, and extensible rights markup language respectively, the security token manager called using a standardized message handling application programming interface used by the plurality of different security token managers not withstanding that each of the plurality of different security token managers creates different token types;

receiving the sending security token of the identified token type selected from among: kerberos, X.509, security assertion markup language, and extensible rights markup language respectively from the corresponding security token manager, the sending security token received using the standardized messaging handling application programming interface in response to the call to the corresponding security token manager, the received sending security token representing information contained in the policy assertions within a token of the identified token type, the sending security token configured for transmission along with the network message;

processing the network message in accordance with any information applicable to the sender of the network message to prepare the network message for transmission; and sending the processed network message along with the sending security token such that a receiver of the network message can securely receive and process the network message in accordance with a represented information contained the sending security token, the receiver compatible with the identified token type; and registering a new security token manager for processing a new type of security token, such that the new security token manager is called by the message handling component through the same standardized message handling application program interface as the other security token managers.

26. The computer program product in accordance with claim 25, wherein said processing the network message comprises including the sending security token in the network message.

27. The computer program product in accordance with claim 25, wherein said processing the network message includes encrypting of at least a portion of the network message using the sending security token.

28. The computer program product in accordance with claim 25, wherein said processing the network message includes signing of at least the portion of the network message using the sending security token.

* * * * *